US011588437B2

(12) United States Patent
Roy et al.

(10) Patent No.: US 11,588,437 B2
(45) Date of Patent: Feb. 21, 2023

(54) AUTOMATIC GENERATION OF REFERENCE CURVES FOR IMPROVED SHORT TERM IRRADIATION PREDICTION IN PV POWER GENERATION

(71) Applicant: Siemens Aktiengesellschaft, Munich (DE)

(72) Inventors: Aditi Roy, Plainsboro, NJ (US); Ti-chiun Chang, Princeton Junction, NJ (US); Patrick Reeb, Adelsdorf (DE); Joachim Bamberger, Stockdorf (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 296 days.

(21) Appl. No.: 17/084,061

(22) Filed: Oct. 29, 2020

(65) Prior Publication Data
US 2021/0135623 A1 May 6, 2021

Related U.S. Application Data

(60) Provisional application No. 62/930,132, filed on Nov. 4, 2019.

(51) Int. Cl.
H02S 50/00 (2014.01)
G01J 1/42 (2006.01)
(Continued)

(52) U.S. Cl.
CPC ............ H02S 50/00 (2013.01); G01J 1/4204 (2013.01); G01J 1/44 (2013.01); G01W 1/12 (2013.01); G01J 2001/4266 (2013.01)

(58) Field of Classification Search
CPC . H02S 50/00; G01J 1/4204; G01J 1/44; G01J 2001/4266; G01W 1/12;
(Continued)

(56) References Cited

U.S. PATENT DOCUMENTS 9,007,460 B2 * 4/2015 Schmidt ............... H04N 13/204
348/143
10,007,999 B2 * 6/2018 Hamann .................. G06T 7/20
(Continued)

FOREIGN PATENT DOCUMENTS

EP         2891904 A1    7/2015
WO     2015104281 A1    7/2015
WO     2017155421 A1    9/2017

OTHER PUBLICATIONS

European Search Report dated Apr. 9, 2021; Application No. 20205765.9; 3 pages.
(Continued)

Primary Examiner — Tung S Lau

(57) ABSTRACT

A system and method for correcting short term irradiance prediction for control of a photovoltaic power station includes an irradiance data manager that generates an observed irradiance curve based on irradiance measurements received from an irradiation sensor, and a reference curve generation engine that generates a reference curve representative of irradiance values for a clear sky day. An irradiance prediction engine generates an irradiance prediction curve based on image segmentation and motion filtering of cloud pixels in sky images. A prediction correction engine corrects the irradiance prediction curve within a short term future time interval based on probabilistic analysis of time segmented intervals of the observed irradiance curve, the reference curve, and the irradiance prediction curve.

15 Claims, 12 Drawing Sheets

(51) Int. Cl.
*G01J 1/44* (2006.01)
*G01W 1/12* (2006.01)

(58) Field of Classification Search
CPC .......... G01W 1/10; Y02E 10/56; Y04S 10/50; H02J 3/004; H02J 3/381; H02J 2300/24
See application file for complete search history.

(56) References Cited

U.S. PATENT DOCUMENTS

| | | | |
|---|---|---|---|
| 10,958,211 B1 | 3/2021 | Sarwat et al. | |
| 10,989,839 B1* | 4/2021 | Matthews | G06T 7/248 |
| 2010/0198420 A1 | 8/2010 | Rettger et al. | |
| 2013/0066569 A1 | 3/2013 | Sato | |
| 2014/0149038 A1* | 5/2014 | Cronin | G01W 1/10 702/3 |
| 2017/0031056 A1* | 2/2017 | Vega-Avila | G06Q 10/0635 |
| 2017/0195605 A1* | 7/2017 | Alves | H04N 5/243 |
| 2018/0039891 A1* | 2/2018 | Hamann | G01W 1/12 |
| 2019/0158011 A1* | 5/2019 | West | H02S 50/00 |

OTHER PUBLICATIONS

Marquez, Ricardo: "Solar Irradiance Forecasting at Multiple Time Horizons and Novel Methods To Evaluate Uncertainty"; PhD Thesis, University of California, Merced, URL: https://escholarship.org/uc/item/34j5k7fx; 2012.
Australian Examination Report dated Jun. 9, 2021; Application No. 2020264320; 7 pages.
Angelov, G. et al. "Behavioral modeling of polycrystalline module ETP660230WW," in 36th International Spring Seminar on Electronics Technology ISSE2013, Alba Iulia, Romania, 2013.
Sun, S. et al., "Short term cloud coverage prediction using ground based all sky imager," in IEEE International Conference on Smart Grid Communications, 2014.
Mavromatakis, F. et al. "Low irradiance losses of photovoltaic modules, Nov. 2017," Solar Energy, vol. 157, pp. 496-506, 2017.
Hinov N., "New Method for Designing Serial Resonant Power Converters", in AIP Conference Proceedings, 2017, ISBN: 978-0-7354-1602-4, doi.org/10.1063/1.5014013.
Chow, C.W. et al., "Intra-hour forecasting with a total sky imager at the UC San Diego solar energy testbed," Solar Energy, vol. 85, No. 11, pp. 2881-2893, 2011.
Reno, Matthew et al., "Global Horizontal Irradiance Clear Sky Models: Implementation and Analysis", Sandia Report SAND2012-2389, 2012.
Badescu, V., "Verification of some very simple clear and cloudy sky models to evaluate global solar irradiance," Solar Energy, vol. 61, pp. 251-264, Oct. 1997.
Haurwitz, B: "Insolation in Relation to Cloudiness and Cloud Density," Journal of Meteorology, vol. 2, pp. 154-166, 1945.
Haurwitz, B.: "Insolation in Relation to Cloud Type," Journal of Meteorology, vol. 3, pp. 123-124, 1946.
Robledo, L. et al., "Luminous efficacy of global solar radiation for clear skies," Energy Conversion and Management, vol. 41, pp. 1769-1779, 2000.
Pvlib python: a python package for modeling solar energy systems, Journal of Open Source Software, 2018. Excerpts from https://pvpmc.sandia.gov/applications/pv_lib-toolbox/: Documentation for PV_LIB Toolbox for Matlab (pv_clearsky_ineichen pp. 1-2, 2014) and Documentation for pvlib-python (Clear Sky pp. 1-21).
Coimbra, Carlos F.M. and Kleissl, Jan: "Overview of Solar-Forecasting Methods and a Metric for Accuracy Evaluation"; Center for Renewable Resources and Integration, Department of Mechanical and Aerospace Engineering, University of California, San Diego; pp. 171-194; Chapter 8; 2013.
Kasten, F. and Czeplak, G.: "Solar and terrestrial radiation dependent on the amount and type of cloud," Solar Energy, vol. 24, pp. 177-189, 1980.

\* cited by examiner

AUTOMATIC GENERATION OF REFERENCE CURVES FOR IMPROVED SHORT TERM IRRADIATION PREDICTION IN PV POWER GENERATION

TECHNICAL FIELD

This application relates to photovoltaic systems for renewable energy. More particularly, this application relates to correction of short term prediction of irradiance to improve control operations for photovoltaic power generation.

BACKGROUND

A photovoltaic (PV) power station relies on accurate prediction of cloud obstruction of the sun for stability and efficiency of power delivery. The benefits of near-term or short term cloud forecast system is manifold. The power forecasts can be used as input for the Energy Management System (EMS) for optimizing the State of Charge (SoC) of the storage devices (e.g., batteries). Distribution System Operators (DSOs) and Transmission System Operators (TSOs) also rely on forecasts to handle the uncertainty and fluctuations of the PV distributed generators connected to their grids. Short term forecasts allow DSOs and TSOs to cope with the intermittent nature of PV plants, avoiding problems in balancing power generation and load demand, to enhance the stability of the system, and reduce the cost of ancillary services. Forecasting also helps in reducing the cost of operation of the entire power system by lowering the number of units in hot standby by allowing efficient solar energy trading and more efficient and secure management of power grids.

In high PV penetration systems (i.e., systems with a ratio of total peak PV power to peak load apparent power), short term intermittency due to clouds leads to disruptions and grid instability from sudden drops in PV output. The integration of short term cloud prediction technology with the solar power stations has been shown to increase the yield of off-grid solar power stations, allowing operators to increase PV output due to the knowledge that there will not be any short term drops due to cloud shadows. As a result, operators may reduce their reliance on expensive alternative options, such as batteries or ongoing spinning reserve from local diesel generators. In addition to upfront cost of these management strategies, inherent inefficiencies can reduce overall yield, such as the power lost in the recharge/discharge process when using batteries or the unused power that is created with running diesel generators for spinning reserve. In some cases when these backup solutions are not available, remote solar power stations have to reduce their overall output, regardless of the amount of solar resource, to ensure that there are no sudden solar power station output variances that may be detrimental to the local grid. With a reliable short term cloud forecast system, solar operators have an accurate understanding of the risk of sudden solar variance occurring in the next 2-5 minutes. Consequently, even without battery backup or extra spinning reserve, off grid power stations can operate without curtailment and with confidence that a cloud shadow will not cause a sudden drop in PV output in the near future.

Light cloud cover of the sun can reduce solar generated power by up to 30% as compared to cloudless conditions. In case of dense cloud cover of sun, the yield could decrease by as much as 75%. Unfortunately, the state-of-art geostationary satellite-based forecast approaches are restricted by their spatial and temporal resolution and are too coarse for very short term forecast applications. The cloud dynamics in a local area and within a short time horizon, say 20 minutes, cannot be accurately predicted by any state-of-the-art computational model. A camera-based system can potentially provide high temporal and spatial resolution hemispherical information of the cloud cover by taking the sky pictures continuously every few seconds.

To predict cloud coverage, computer vision techniques are a useful tool, such as image segmentation of cloud pixels. Due to variations in sky conditions, time of day and of year, etc., accurately identifying clouds in images is a very challenging task. A particularly difficult area for sky image segmentation is the region nearest the sun, where intensity saturation and optical artifacts (e.g., glare) are present. A generally adequate classifier that is good in general may not work well for this area. In many cases, glares are mistakenly identified as clouds while most of the sky is clear. These misclassifications disrupt the short term forecast and often lead to false alarms or missed detections in the control systems described above for PV installations.

For clear sky solar irradiance estimation, models and implementations have been proposed, ranging from considering only the geometric configuration and astronomical parameters to including atmospheric state such as air pressure, temperature, relative humidity, aerosol content, Rayleigh scattering ozone, aerosols, and perceptible water. Unfortunately, due to stochastic astronomical and atmospheric conditions and possibly unknown and unmodeled factors, the existing estimation methods for the solar irradiance are not accurate enough to avoid false alarms and to meet the above-described demands of a PV power station.

SUMMARY

A system and method for a robust, efficient, and accurate solution for estimating short term solar irradiance to improve operations of a photovoltaic power station. The aforementioned problems are addressed using direct visual observations of sky conditions and analysis to reduce false alarms of forecasted cloudiness.

In an aspect, a system and method for estimating short term irradiance prediction for control of a photovoltaic power station includes an irradiance data manager that generates an observed irradiance curve based on irradiance measurements received from an irradiation sensor, and a reference curve generation engine that generates a reference curve representative of irradiance values for a clear sky day using a parametric prediction model. An irradiance prediction engine generates an irradiance prediction curve based on image segmentation and motion filtering of cloud pixels in sky images. A prediction correction engine corrects the irradiance prediction curve within a short term future time interval based on probabilistic analysis of time segmented intervals of the observed irradiance curve, the reference curve, and the irradiance prediction curve.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and systems are disclosed for correction of short term irradiance prediction for a photovoltaic power station that reduces false alarms caused by erroneous image classifications, such as effects of solar glare. A prediction correction engine is used to evaluate recent irradiance measurements along with long term irradiance predictions obtained by computer vision to adjust the short term irradiance prediction on a condition that erroneous cloudiness was predicted. Solutions are disclosed for automatic generation of clear sky reference curves used for guiding the correction of the short term irradiance prediction.

Figure 1:
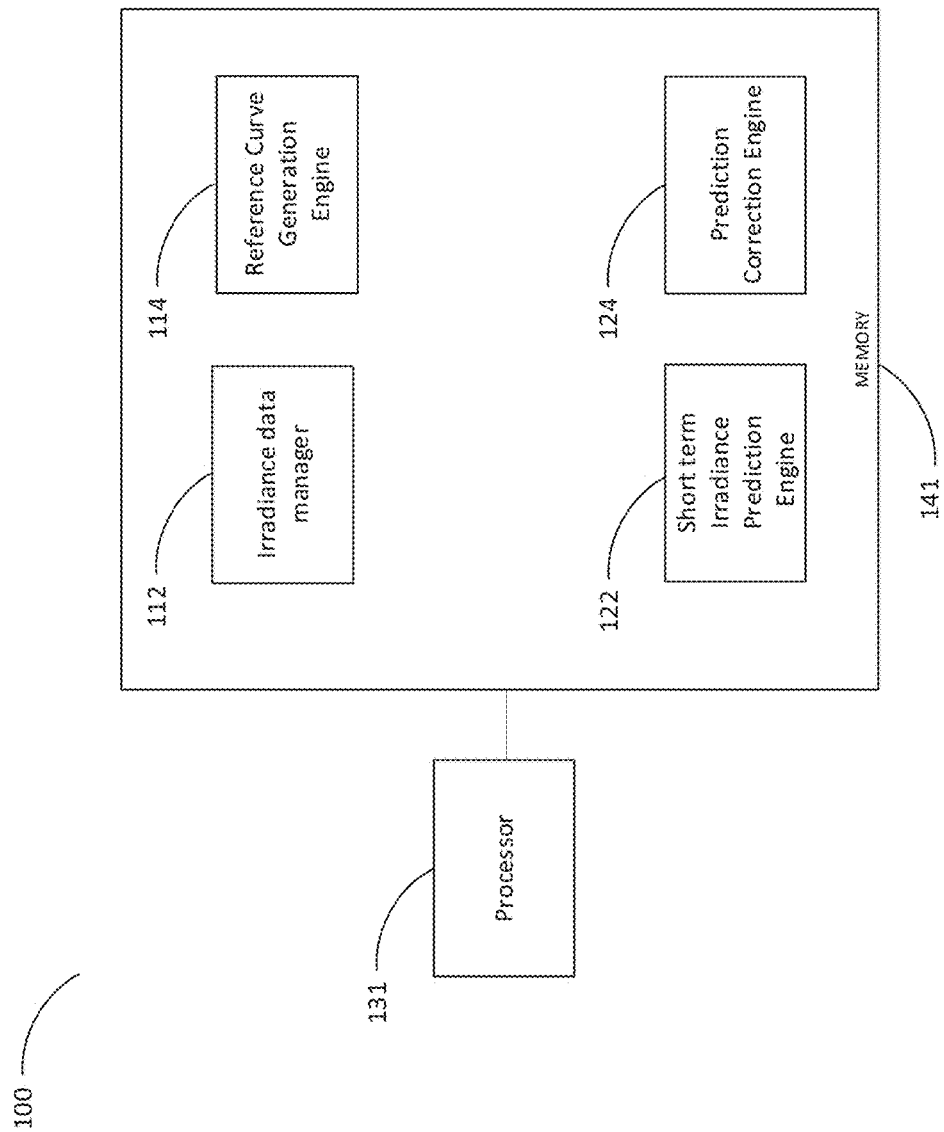
FIG. 1 is a block diagram for an example of a system to improve prediction of short term irradiance in accordance with embodiments of the disclosure.

FIG. 1 is a block diagram for an example of a system to correct prediction of short term irradiance prediction in accordance with embodiments of the disclosure. System 100 includes a computer processor 131 and memory 141 having stored thereon modular programmable instructions and algorithms with functionality to perform corrected short term irradiation prediction, including an irradiance data manager 112, a reference curve generation engine 114, and an irradiation prediction engine 122, and a prediction correction engine 124.

Figure 2:
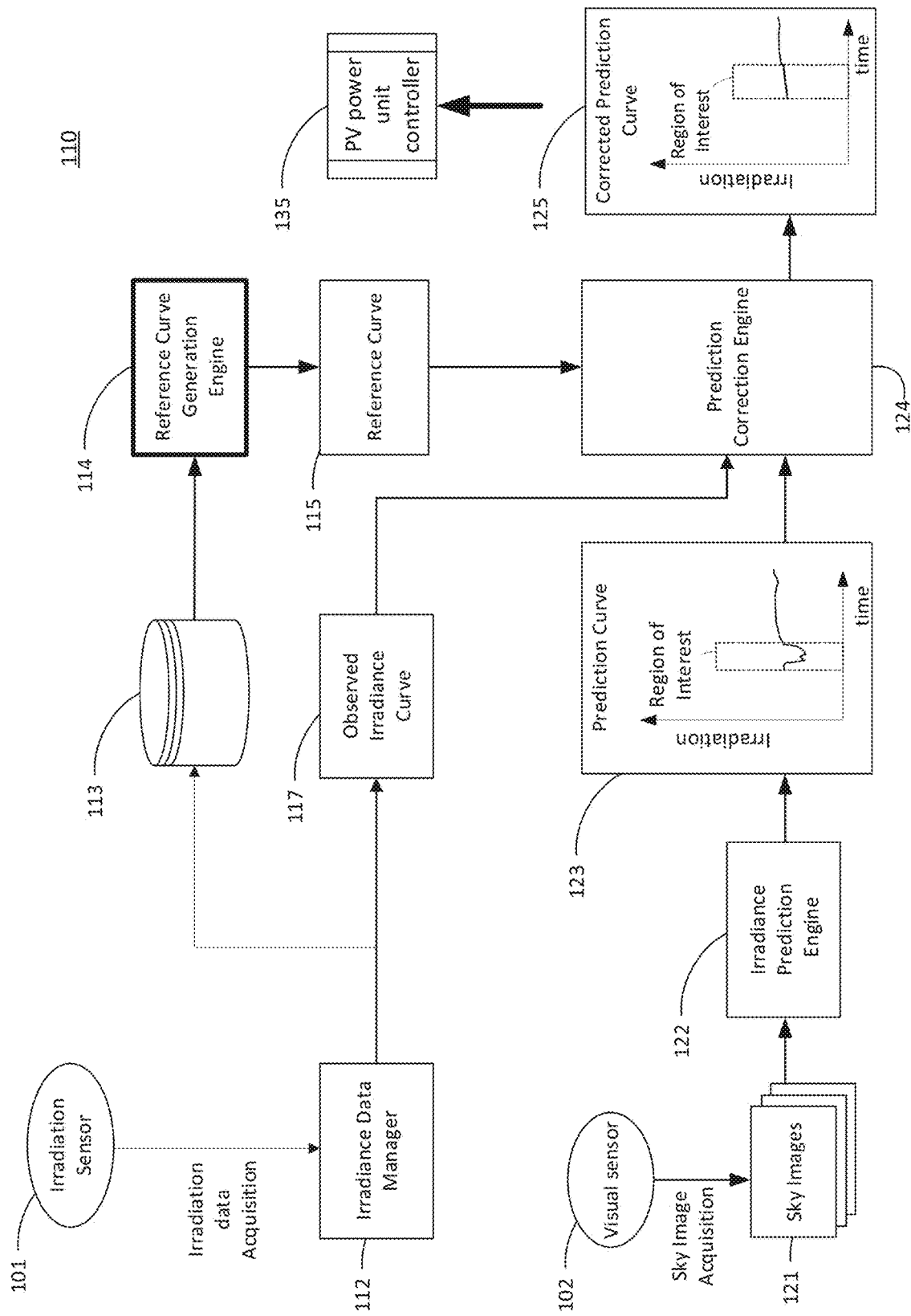
FIG. 2 is a flow diagram for an example of a process for correction of short term irradiance prediction in accordance with embodiments of the disclosure.

FIG. 2 is a flow diagram for an example of a process for correction of short term irradiance prediction in accordance with embodiments of the disclosure. In an embodiment, process 110 has an objective to detect approaching clouds as a potential trigger for false alarm for irradiation prediction and corrects a short term prediction curve using a reference curve representative of a clear sky. An irradiation sensor 101 (e.g., a pyranometer or similar device) collects measurements of solar irradiation at a PV station. The irradiation data acquisition is received by irradiance data manager 112, which archives the irradiance data to storage 113, such as local or cloud-based memory, and may generate an observed irradiance curve 117 when required as a representation of measured irradiance level over time. To determine whether the irradiance data obtained during any time of the day indicates clear sky or not, a reference is required. The observed irradiance data must be compared against that clear sky irradiance reference to determine cloudiness. Reference curve generation engine 114 is configured to generate reference curves 115 representative of ideal daily irradiance such as for a clear sky (i.e., cloudless) associated with the day of year for the current day of operation. Visual sensor 102 (e.g., sky camera) acquires sky images 121. A short-term irradiance prediction engine 122 applies visual analytics on sky image data to perform initial cloud segmentation to predict initial future irradiance for the next time interval, producing a prediction curve 123. Prediction correction engine 124 computes a clear sky prediction for a short term time interval based on past time intervals of observed irradiance measurements. Prediction correction engine 124 compares data of an observed irradiance curve 117 to data of the reference curve 115 for different time intervals using one or more difference measurement types, and then comparing each difference value to an experimental threshold. A clear sky probability for short term irradiance is derived and used to adjust the prediction curve based on the reference curve.

Generation of the reference curve 115 by reference curve generation engine 114 will now be described in greater detail. In instances where irradiance data for a clear sky day is not available for the date of interest, a clear sky reference curve (CSRC) can be derived based on irradiance data for clear sky days of nearby dates. In an embodiment, one of several algorithms is selected for generation of CSRC depending on the availability of historical clear sky data. Historical clear sky data can be used as anchors to compute the CSRC of any given day, referred herein as clear sky anchor curves (CSAC). The following description thus refers to two stages: (i) CSAC generation, and (ii) CSRC generation.

Anchor days can be derived as reference for irradiation prediction throughout the calendar year to accurately represent daily variations of irradiation caused by seasonal solar cycles. For example, summer days in the northern hemisphere experience higher irradiance levels than spring days as the solar zenith is higher and length of day is longer. In an embodiment, a plurality of anchor days is selected in such a way that there is an adequate coverage spread evenly throughout the calendar year, such as one or two anchor days per month. If enough clear sky irradiation data from past several years are available, then such data is directly used to generate the CSACs. In case of absence of such data, for example in a newly deployed location, automated generation of CSAC becomes a challenging task. Further, it has been observed that complete clear sky for the entire day may not be present in certain locations and may be present only a few days in a year, which can be solved by implementing an intra-day irradiance data combination approach.

In an embodiment for which sufficient amounts of historical irradiance data is available (e.g., irradiance curve data is available for the past several years for a given deployment location), an algorithm is selected with an objective to automatically select best anchors days such that the anchor curves are distributed throughout the year. To automatically perform such selection, the reference curve generation engine 114 performs the following steps to determine whether the irradiance data from a given day represents a clear sky day or not. First, the intensity of solar radiation is computed for that day in that specific location based on several astronomical and environmental conditions using a parametrized prediction model. Since the true conditions can hardly be modeled precisely, the model parameters are chosen in such a way that the computed curve fits the measured irradiance as closely as possible. Next, the fitted curve is compared against the actual irradiance data measured by the irradiation sensor 101 (e.g., pyranometer). If both curves match each other, it indicates that there was no cloudiness present in the actual irradiance data, thus it represents a clear sky day.

Figure 3:
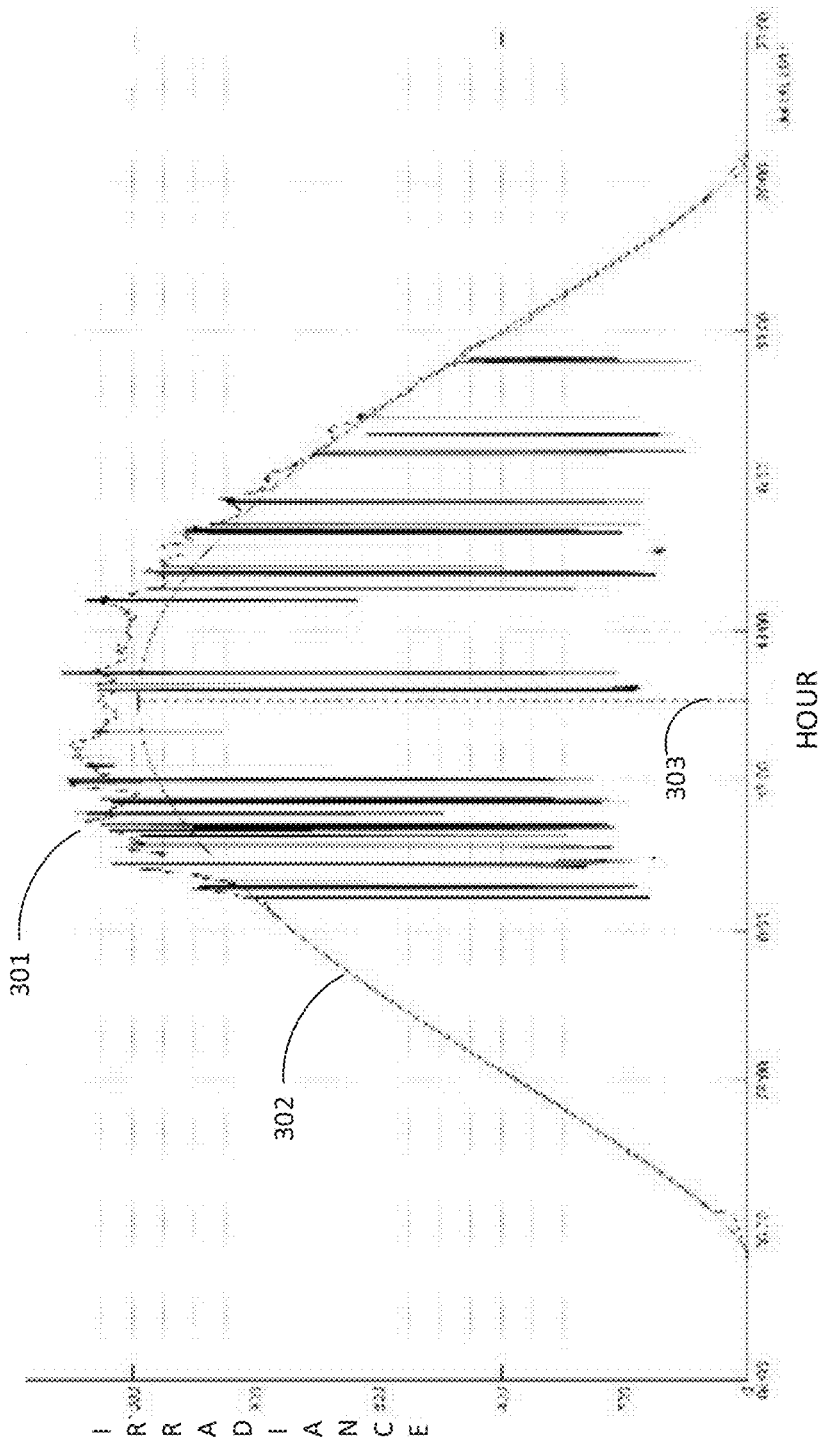
FIG. 3 shows an example of a predicted irradiation curve compared to actual irradiation data for a single day with an unclear sky in accordance with embodiments of this disclosure.

FIG. 3 shows an example of a predicted irradiation curve compared to actual irradiation data for a single day with an unclear sky in accordance with embodiments of this disclosure. Analog irradiance data recorded by an irradiation sensor 101 (e.g., pyranometer) for a single day at the target location is plotted as irradiance curve 301. A clear sky prediction curve 302 is generated by the reference curve generation engine 114 using the prediction model with model parameters. Solar noon is denoted by line 303. The reference curve generation engine 114 compares the irradiance curve 301 to the predicted curve 302 and determines that the irradiation data for this day is not representative of clear sky based on difference in magnitude between the two curves 301, 302.

Figure 4:
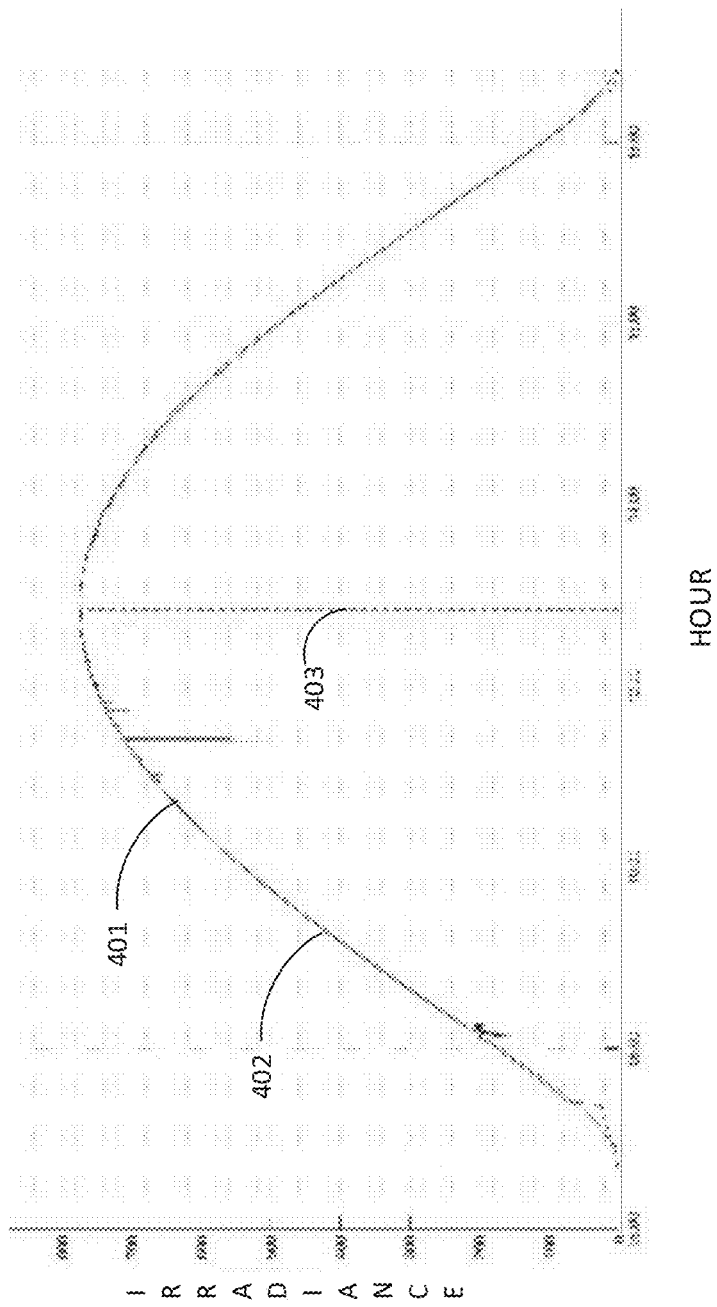
FIG. 4 shows an example of a predicted curve compared to irradiation data for a single day with a clear sky in accordance with embodiments of this disclosure.

FIG. 4 shows an example of a predicted curve compared to irradiation data for a single day with a clear sky in accordance with embodiments of this disclosure. Analog irradiance data recorded by the pyranometer for a single day at the target location is plotted as irradiance curve 401. Prediction curve 402 is generated by the reference curve generation engine 114 using the prediction model with model parameters. Solar noon is denoted by line 403. The reference curve generation engine 114 compares the measured irradiance curve 401 to the prediction curve 402 and determines that the irradiation data for this day is representative of clear sky based on a strong match in magnitude between the two curves 401, 402. In an embodiment, a threshold for difference between measured irradiance and predicted irradiance is applied to determine an acceptable match. For example, on a condition that the difference is within a threshold for a time segment of the anchor day, such as between 10:00 and 14:00, the irradiance data 401 or the fitted curve 402 of that day can be used as a CSAC. For additional robustness, the test for satisfying CSAC requirement is for the threshold comparison to be applied to the entire daylight time segment.

In an aspect, the data comparisons shown in FIGS. 3 and 4 between predicted irradiance (PI) (curves 302, 402) and actual irradiance (AI) (curves 301, 401) are performed by reference curve generation engine 114 using three measures: mean, standard deviation, and Fréchet Distance. Based on the difference in values between these measures, clear sky day is predicted as follows:

If $(((mean(AI_x) - mean(PI_x)) \le \theta_1$ and $(stdev(AI_x) - stdev(PI_x)) < \theta_2)$ or $(frechetDist(AI_x, PI_x) < \theta_3))$, then
CSAC=AI   (Eq. 1)

where: $\theta_1, \theta_2, \theta_3$ are predetermined thresholds (e.g., determined by experiment),
   mean is a mean value for the interval;
   stdev is standard deviation value for the interval; and
   frechetDist Fréchet distance value for the interval.
When multiple such CSACs are generated by the reference curve generation engine 114, at least one of the CSACs (preferably 2 or more) are selected per month having an average of 15 days or less of interval among them. Thus, in an embodiment, a total of 12 to 24 CSACs are saved representing a complete year's worth of reference curves, spread across a span of twelve months.

In an embodiment, reference curve generation engine 114 is configured to compute the CSAC from limited past irradiance data, such as in the case of a solar irradiance system set up in a new location $L_n$ and an objective is to become operational as soon as possible. On a condition that data collected in other locations $L_o$ is available, such data can be transferred and translated to new location $L_n$. While acquiring data in new location $L_n$, the automatic clear sky detection can be performed as described above. Once a clear sky is detected in new location $L_n$, the CSAC is compared with the CSAC from $L_o$ on the same day. Adjustment to CSAC from $L_o$ for the translation to new location $L_n$ is based on the difference between the two curves. As more CSACs for location $L_n$ are detected, more accurate CSACs can be derived by a simple regression analysis between the two locations $L_o$ and $L_n$.

Figure 5:
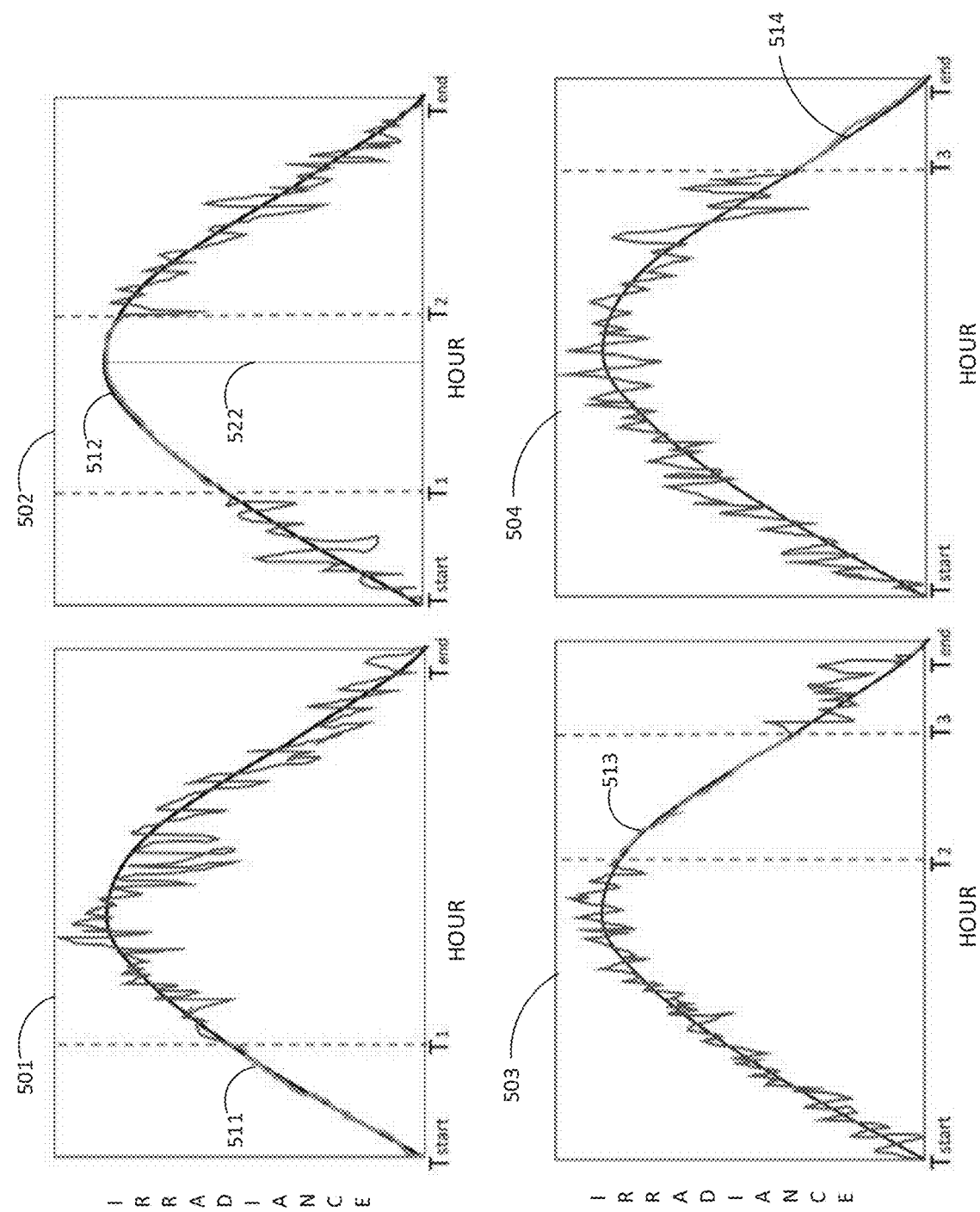
FIG. 5 shows a sampling of irradiance curves for a partial clear sky day used for intra-day irradiance manipulation in accordance with embodiments of this disclosure.

FIG. 5 shows a sampling of irradiance curves for a partial clear sky day used for intra-day irradiance manipulation in accordance with embodiments of this disclosure. In order to address irradiance data for days in which partial clear sky pose a challenge to a simple anchor curve derivation, reference curve generation engine 114 is configured to combine clear sky irradiance data of multiple days. Reference curve generation engine 114 is configured to extract clear sky irradiance data, such as detected peak irradiance curve portions from archived irradiance curves 113, and to construct anchor reference curves that mimics a clear sky by interpolation as necessary. A clear sky time segment of various partial clear sky days can be identified using a sliding window approach for a complete daylight time span (e.g., $T_{start}$ to $T_{end}$) when comparing actual irradiance data curves to predicted clear sky irradiance curves generated by the prediction model. Reference curve generation engine 114 is configured to move a sliding window over irradiation curves from left to right, i.e., from start of the day to end of the day. In an aspect, a 50% overlap may be applied to adjacent sliding windows. At each position of the sliding window (e.g., $i^{th}$ position), an actual irradiance curve segment ($AI_i$) and a predicted curve segment ($PI_i$) are extracted from the subpart of the AI curve and PI curve, respectively within the window. As shown in FIG. 5, for example, irradiance curves 501, 502, 503, and 504 illustrate comparison of AI curve data and smooth PI curve data corresponding to four different days having complementary clear sky segments denoted by sliding windows 511, 512, 513, 514 respectively. The sliding window time periods are $T_{start}$ to T1 for clear sky period 511, T1 to T2 for 512, T2 to T3 for 513, and T3 to $T_{end}$ for 514. Using Eq. 1, reference curve generation engine 114 compares curve $AI_i$ with curve $PI_i$. If the curves match, then the time segment of the day corresponding to that $i^{th}$ sliding window is determined to be a clear sky segment. This process is repeated for the entire time of the day and all the clear sky segments are identified for that day. The size of the sliding window can be decided empirically. For instance, an overlapping window size of 10 minutes can be selected that moves from start time $T_{start}$ to end time $T_{end}$ for the day. Thus, clear sky property of every 10 minutes will be detected using the proposed approach.

Alternatively, it can be sufficient in an aspect to have clear sky conditions around noon (e.g., about 10:00-14:00) to estimate the CSAC as the shape of the curve does mainly depend on location and peak irradiation, such that missing segments in the morning and afternoon will match. For example, irradiance comparison curve 502 shows a clear sky segment before and after solar noon 522, and a match between curves AI and PI. Hence, provided a clear sky irradiation formula is used to match the irradiation at noon time with clear sky conditions, the estimated curve PI is determined to be sufficiently accurate as an estimate for a CSAC the entire day despite the mismatch in morning and afternoon segments.

Returning to FIG. 5, once clear sky segments (CSS) of multiple days are identified, such as segments 511, 512 513, 514, the start-end time stamps of a segment are compared against the start-end time stamps of other segments to determine whether the combination of all the clear sky segments is capable of representing a whole day. The identified segments are them combined to create the complete CSAC as follows:

$$CSAC=CSS_1(T_1-T_{start})+CSS_2(T_2-T_1)+CSS_3(T_3-T_4)+\ldots+CSS_n(T_{end}-T_n) \quad (Eq.\ 2)$$

Figure 6:
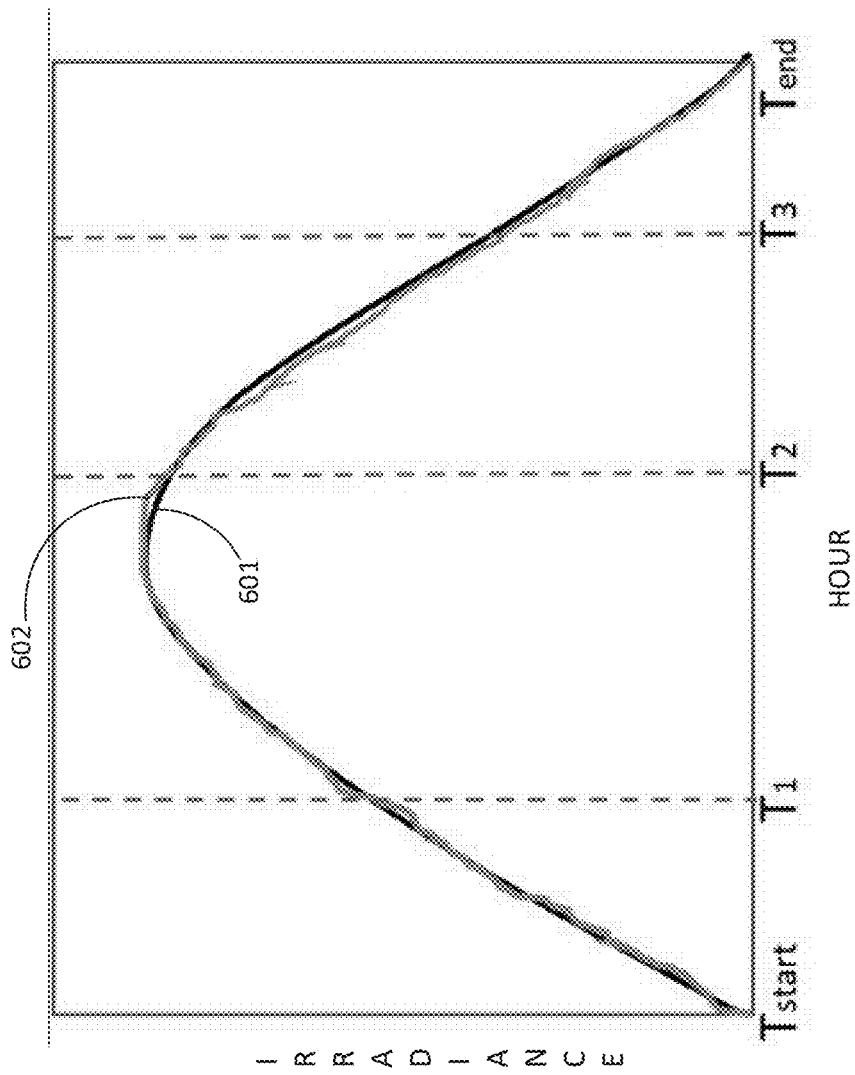
FIG. 6 shows an example of a CSAC generated by combination of clear sky segments in accordance with embodiments of this disclosure.

FIG. 6 shows an example of a CSAC generated by combination of clear sky segments in accordance with embodiments of this disclosure. As shown in FIG. 6, reference curve generation engine 114 generates a CSAC based on combined segments 511, 512, 513, 514 to form a curve comparison between irradiance prediction curve 601 actual irradiation curve 602. Based on the closely matched curves resulting from the combination, the CSAC can be derived from the predicted irradiation curve 601. Once the CSAC is determined, reference curve generation engine 114 identifies a date label based on a weighted combination of the dates associated with each CSS, expressed as follows:

$$FCn=(1-((T_n-T_{n-2})/(T_{end}-T_{start})))*(CSSdate_{n+1}-CSSdate_n) \quad (Eq.\ 3)$$

$$CSACdate=CSSdate_1+FC_1+FC_2+\ldots+FC_n \quad (Eq.\ 4)$$

Figure 7:
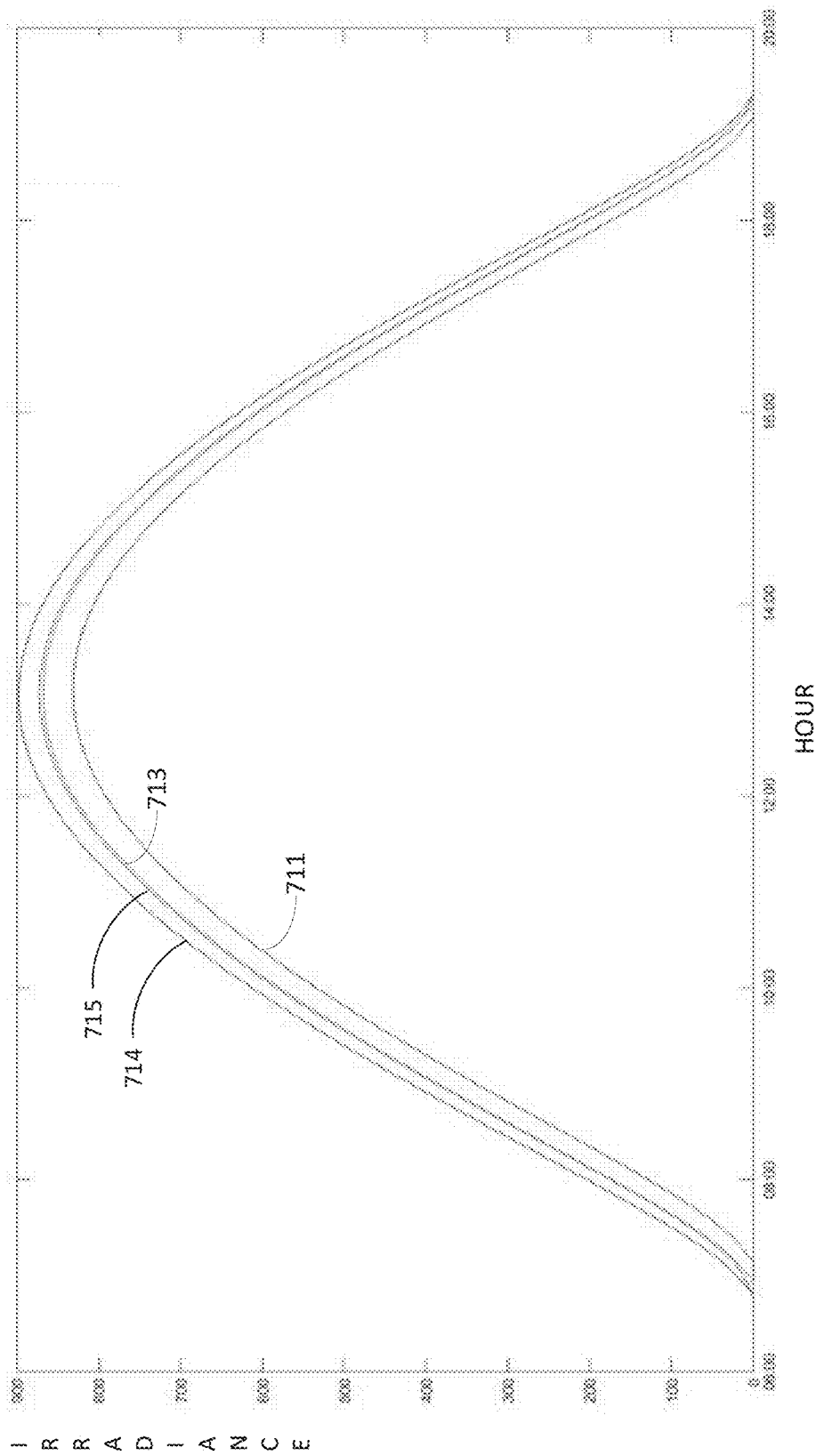
FIG. 7 shows an example of irradiance data interpolation for clear sky reference curve generation representing irradiance for a clear sky day in accordance with embodiments of the disclosure.

Once the CSACs are determined, a CSRC is generated for any given date by the reference curve generation engine 114 using an interpolation or an extrapolation process as follows. In an aspect, reference curve 115 is derived by reference curve generation engine 114 performing interpolation between a first CSAC associated with an anchor day date previous to the current day of operation, and a second CSAC associated with a second anchor day. In an aspect, the first anchor day may be selected to correspond with a calendar date that precedes the current day and the second anchor day may be selected to correspond with a calendar date that follows the current day of operation (e.g., current day of operation is Jan. 15, 2020, first anchor day is Jan. 1, 2019, second anchor day is Feb. 1, 2019). The CSRC for the target date is interpolated between the first and second CSACs, in an embodiment, according to the following expression:

$$CSRC=weight*CSAC_1+(1-weight)*CSAC_2 \quad (Eq.\ 5)$$

where:
weight=$(CSAC_2\_date-Target\_Date)/[(CSAC_2\_date-Target\_Date)+(Target\_Date-CSAC_1\_date)]$ FIG. 7 shows an example of irradiance data interpolation for clear sky reference curve generation representing irradiance for a clear sky day in accordance with embodiments of the disclosure. Reference curve generation engine 114 interpolates irradiance data associated with a first anchor day $CSAC_1$ and a second anchor day $CSAC_2$, shown as anchor reference curves 711 and 714, respectively. The result of the data interpolation is represented by reference curve 715. In this example, anchor reference curve 711 represents irradiance measurements of a clear sky day for a first anchor day with the day of year prior to the current operation day, while anchor reference curve 714 relates to an anchor day with the day of year following the current operation day. Reference curve 715 closely matches the ground truth clear sky irradiance curve 713, demonstrating the accuracy for this embodiment.

To address the problem in which anchor curves may not be available for the entire year (e.g., a second anchor curve $CSAC_2$ for a future calendar date used for interpolation as described above), such as in the case of a new deployment, an extrapolation approach is applied by reference curve generation engine 114 as follows. In an embodiment, the clear sky reference curve is generated for a target day by extrapolation from the anchor curve according to a proportion commensurate with the difference between the anchor day calendar date and the target day calendar date. For example, using June and December solstices as references, and knowing that solar irradiance increases in the northern hemisphere between December and June, a CSAC of a prior anchor day date may be selected and an increasing extrapolation is performed to predict the CSRC for a target date that falls between December and June for a PV deployment in the northern hemisphere. Similarly, decreasing extrapolations are performed for target date that falls between June and December for northern hemisphere deployment. The increasing/decreasing extrapolations are reversed for southern hemisphere deployment. In an embodiment, a linear extrapolation is performed. In another embodiment, a quadratic extrapolation is performed.

Figure 8:
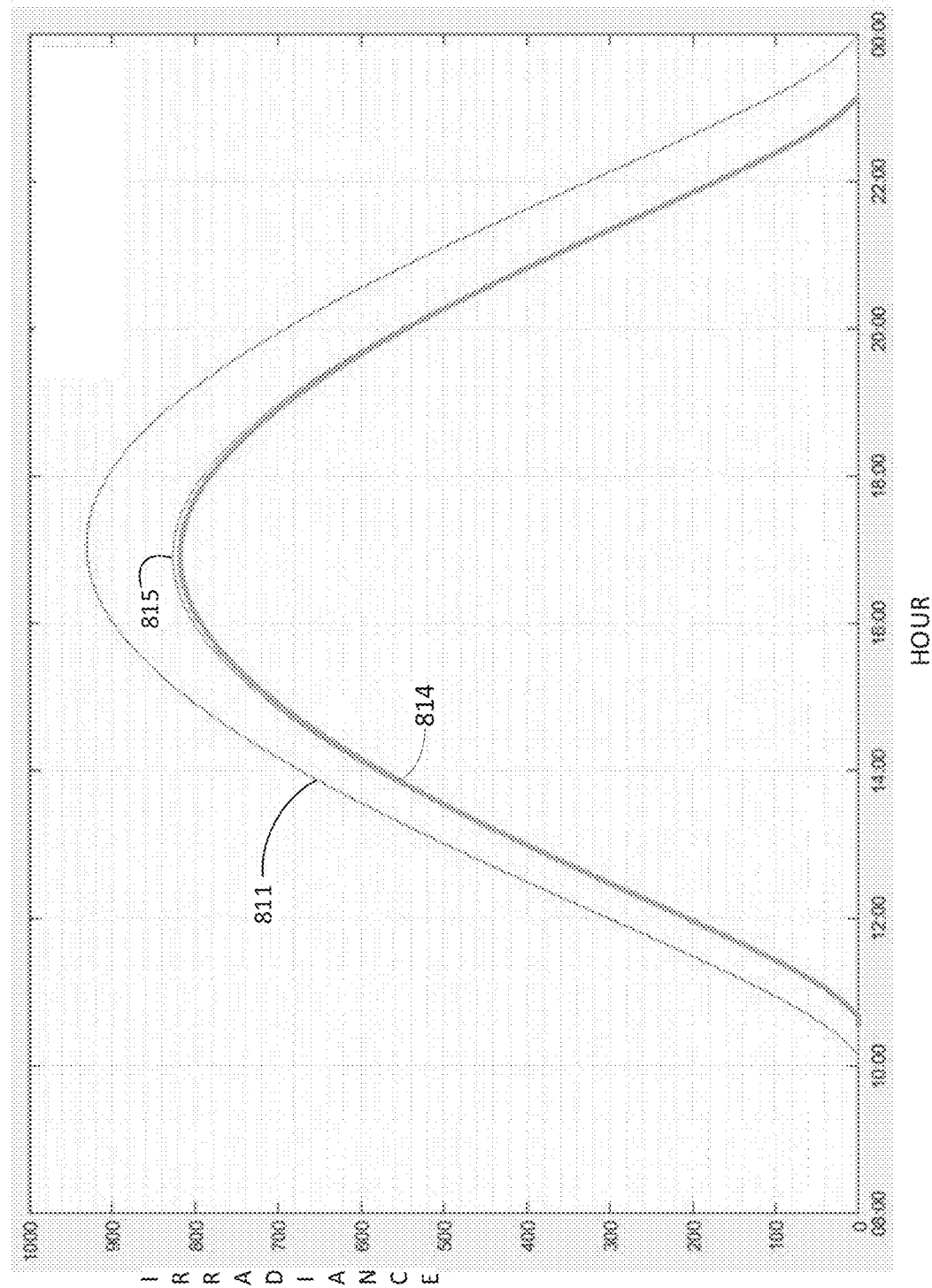
FIG. 8 shows an example of clear sky reference curve extrapolation based on a clear sky model in accordance with embodiments of this disclosure.

FIG. 8 shows an example of clear sky reference curve extrapolation based on a clear sky model in accordance with embodiments of this disclosure. In an embodiment, reference curve generation engine 114 applies a parameterized clear sky model, including parameters for temperature and humidity, to predict solar irradiance for any day of the year. Parameters are varied to find the best fit with measured irradiation values obtained by irradiation sensor 101. The clear sky model applies a rule in which parameters, such as temperature and humidity, which are a best fit from previous curves, remain similar. As shown by the example in FIG. 8, reference curve generation engine 114 uses the clear sky model to predict a first curve 811 for a previous date and a second curve 814 for another date prior to or after the target date. Reference curve generation engine 114 performs an interpolation, extrapolation, or both, and generates the CSRC 815 based on one or both of the interpolation and extrapolation. For example, to both interpolation and extrapolation, a pair of predicted curves can be generated, both associated with dates prior to the target date, and a first reference curve is extrapolated from those. Another pair of predicted curves with dates before and after the target date can be generated, and a second reference curve can be interpolated between the two curves. The final reference curve can be selected from the first and the second reference curve.

Next will be described how the clear sky reference curve CSRC can be applied to improve short term irradiance prediction, such as to avoid false alarms of predicted downtime for PV power generation. Returning to FIG. 2, sky image acquisition from a visual sensor 102 (e.g., a solar camera) produces sky images 121. Short term irradiance prediction engine 122 receives the sky images and performs computer vision based visual analytics to produce the irradiance estimate for a given time horizon. In an embodiment, irradiance prediction engine 122 includes a visual analytics module that develops a cloud classifier using a deep learning based neural network (DNN). Offline training of the neural network is performed to produce algorithm parameters, which are used for run-time cloud detection. Next, consecutive sky images are used for cloud motion estimation which is useful for predicting future cloud trajectory and thus sunlight occlusion. Given the cloud detection with motion maps and clear sky solar irradiation as the basic information, future solar irradiance is estimated by the irradiance prediction engine 122.

In an embodiment, visual analytics of sky images captured by a solar camera includes analyzing a sky image at radii related to short term horizon for predicting irradiance. Pixel segmentation mappings can be generated as potential cloud pixels. Irradiance prediction engine 122 generates irradiance prediction data which can be represented as a prediction curve 123 that shows predicted irradiation values according to expected cloudiness. The short term prediction horizon is the region of interest for potential misclassification of cloud pixels due to potential presence of artifacts (e.g., solar glare).

Prediction correction engine 124 receives the data associated with the reference curve 115, the observed irradiance curve 117, and the prediction curve 123 and performs a probabilistic analysis of time segmented intervals based on the past and future irradiance knowledge. If the analysis predicts a clear sky for the short term irradiance prediction, the predicted irradiance data for the region of interest is corrected to adjust the irradiance prediction that was based on misclassified cloudiness, shown as corrected prediction curve 125. Because the acquisition of irradiance data by irradiance data manager 112 is independent of cloud segmentation by irradiation prediction engine 122, the disclosed systems and methods can correct errors in cloud classification. If the prediction correction engine predicts a cloudy sky for the region of interest, then the prediction curve 123 remains the same as generated by the irradiation prediction engine 122 using image segmentation. The output of prediction correction engine 124 is supplied to a PV power unit controller 135 for control operations related to PV power generation, which may include SoC of storage devices, downtime planning, balancing power generation and load demand, system stability, hot standby control, and other controllable features for a PV power station.

Figure 9:
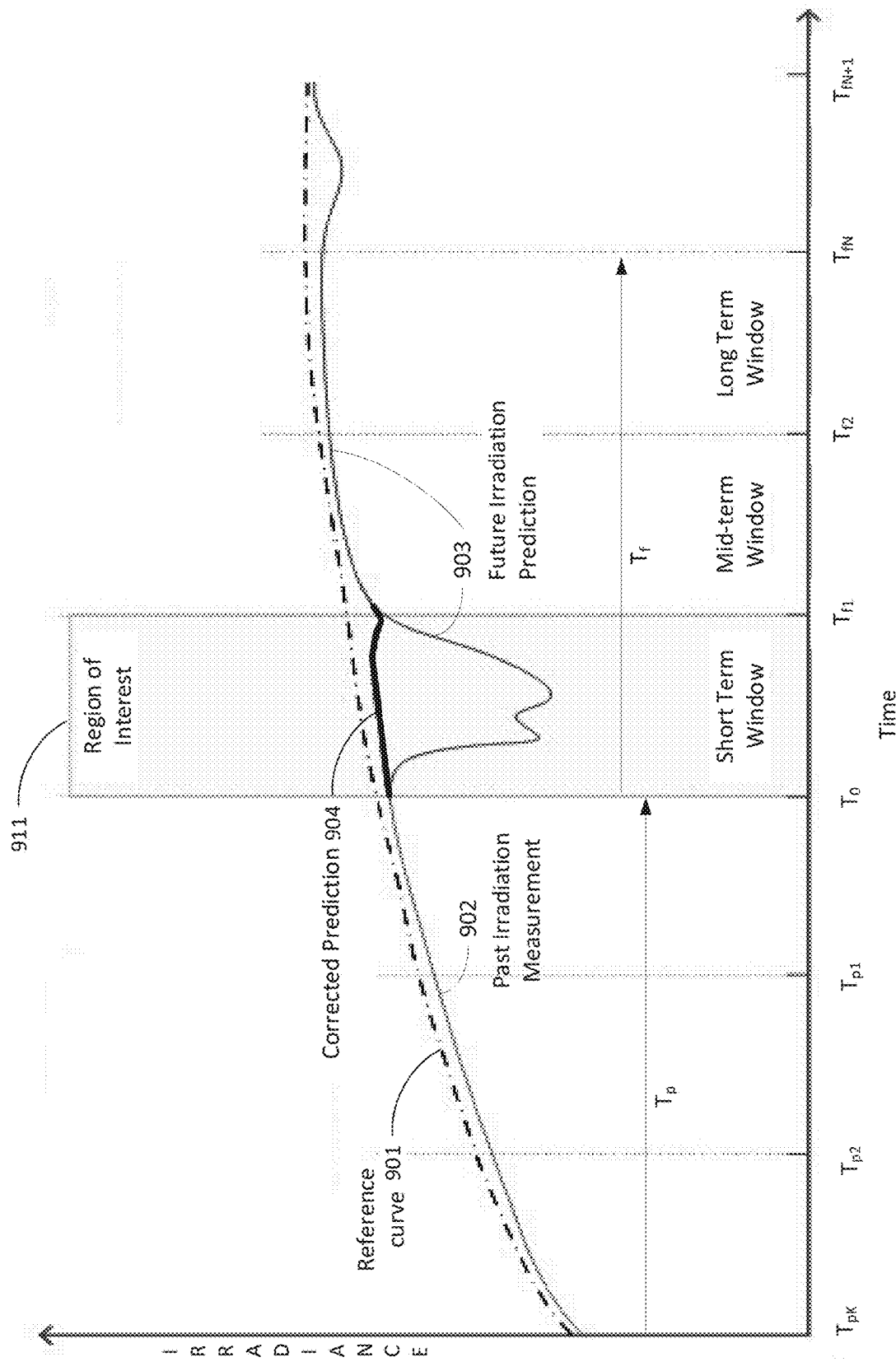
FIG. 9 illustrates an example for corrected short term irradiation prediction in accordance with embodiments of the disclosure.

FIG. 9 illustrates an example for corrected short term irradiation prediction in accordance with embodiments of the disclosure. Irradiance data is represented by several curves across past time interval $T_p$ and future time interval $T_f$. In an embodiment, system 100 predicts irradiance in a short term, where total irradiation period $T_f$ is divided into N intervals (e.g., N=3), and the nearest interval $T_{f1}$ (e.g., first 5 minutes) is a region of interest 911, labeled as a short term window, for being most affected by false cloud segmentation in the sky region nearest to the sun. In an embodiment, the prediction correction engine 124 receives past irradiation measurement data and generates curve 902. The data for irradiation observation interval $T_p$ is segmented into past K intervals $T_{p1}$, $T_{p2}$, $T_{pK}$, by the prediction correction engine 124. Likewise, irradiation prediction data for future intervals is received by prediction correction engine 124 which generates and segments curve 903 into short term window $T_{f1}$, a mid-term window $T_{f2}$, and a long term window $T_{fN}$. The region of interest 911 for irradiation prediction is the time period between $T_0$ to $T_{f1}$. In some embodiments, the number of intervals N can be a value different than 3 (e.g., N=4 or 5) and the duration for the total future irradiation prediction $T_f$ can be a value within a selectable range (e.g., $T_f$=10 to 30 minutes). System 100 is based on the hypothesis that if there are clear sky conditions around the first prediction window $T_{f1}$, meaning the past intervals for a predefined time $T_p$ and in future time intervals of $T_f$ (e.g., $T_{f2}$, $T_{f3}$), then there is high probability of having clear sky in the near future, the region of interest 911. Past irradiance observation data from irradiation sensor 101 is rendered as observation curve 902, which closely follows the path of the reference curve 901 for a clear sky. Future irradiance prediction curve 903 indicates a severe variation from the reference curve 901 within the region of interest 911, and is indicative of a misclassification of cloud pixels classified by irradiance prediction engine 122 based on sky images. A corrected prediction curve 904 is constructed by the prediction correction engine 124 using probabilistic time series analysis based on the past observation interval data $T_p$ and the mid-term and long-term window data of the future irradiation prediction interval $T_f$.

Figure 10:
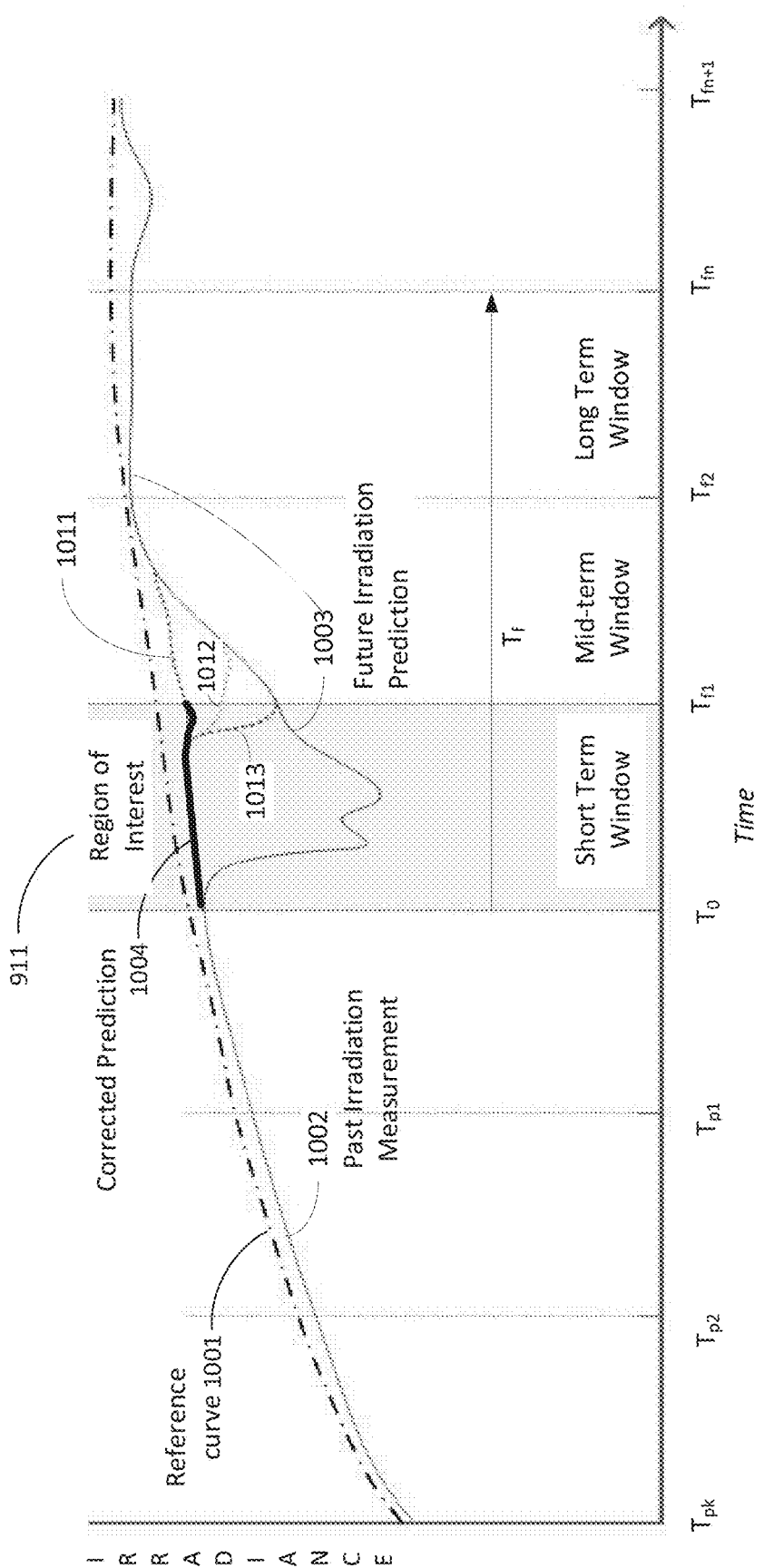
FIG. 10 illustrates an example for various corrected irradiation prediction curve interpolations in accordance with embodiments of the disclosure.

FIG. 10 illustrates an example for various corrected irradiation prediction curve interpolations in accordance with embodiments of the disclosure. In some embodiments, various smoothing operations are available to blend the original prediction curve to the corrected prediction curve. Similar to the prediction curve shown in FIG. 9, FIG. 10 shows a reference curve 1001, an observation curve 1002 for past irradiation measurements, a future irradiation prediction curve 1003 indicative of misclassification of cloud pixels within the region of interest 1011, and a corrected prediction 1004. In contrast to the reference curve shown in FIG. 9, the future irradiation prediction curve 1003 deviates from the reference curve 1001 in both the short term window and the mid-term window. Depending on the selected smoothing operation, it is possible to further smooth away artifacts without having to extend the short term window size for region of interest 1011 or the overall required prediction horizon $T_f$. For example, where $T_f$=15, N=3, and the window sizes each equal 5 minutes, the smoothing operation can accomplish smoothing while keeping a short 5 minute window for the short term prediction. Avoiding extended prediction horizon is beneficial given the unreliable nature of camera-based prediction worsens as a forecast period is increased. As shown in FIG. 10, an optimistic smoothing operation produces blending curve 1011 by interpolating prediction curve 1003 and corrected prediction curve 1004 by using the $T_{f1}$ value of corrected prediction curve 1004 and interpolating the next prediction point ($T_{f1}$+1) using the following prediction curve point ($T_{f1}$+2). A medium smoothing operation produces blending curve 1012 by using the corrected prediction curve 1004 at point $T_{f1}$−1 and interpolating the corrected prediction curve 1004 at $T_{f1}$ using the predicted point at $T_{f1}$+1. An aggressive smoothing operation uses the point $T_{f1}$−2 of corrected prediction curve 1004 and the point $T_{f1}$ of prediction curve 1003 to interpolate for the value at point $T_{f1}$−1. In an embodiment, the smoothing operation selection can be preselected as a system parameter for system 100 when initializing the irradiance prediction correction process.

Figure 11:
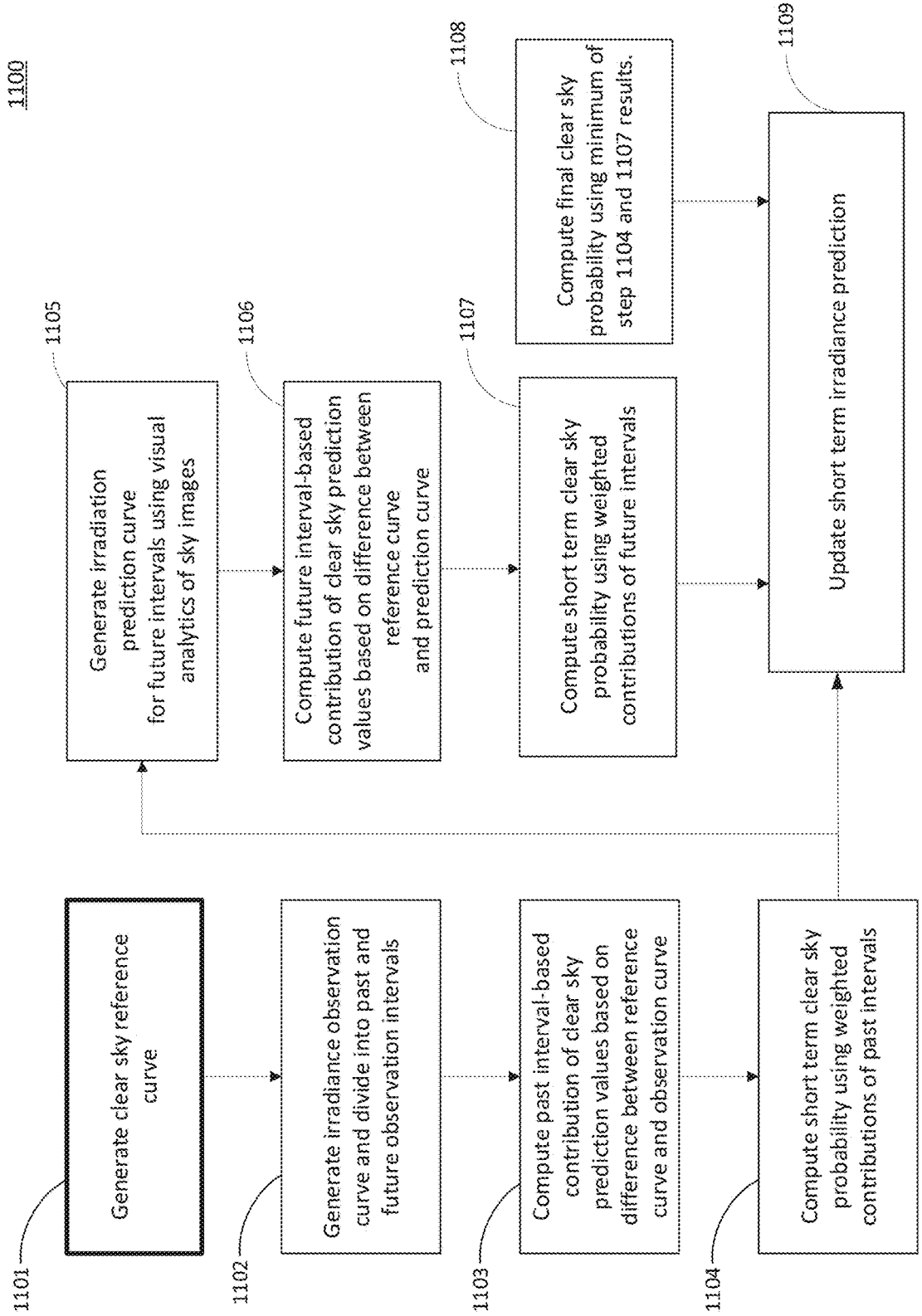
FIG. 11 shows an example of a method flowchart for correcting short term irradiance predictions in accordance with embodiments of the disclosure.

FIG. 11 shows an example of a method flowchart for correcting short term irradiance predictions in accordance with embodiments of the disclosure. In step 1101, reference curve generation engine 114 generates a reference curve representing a clear sky day for the current day of the calendar year, using any of the various techniques described above. Using irradiance values measured by an irradiance sensor 101 (e.g., a pyranometer), irradiance data manager 112 generates an irradiance observation curve 117 having K interval windows at step 1102.

Prediction correction engine 124 computes a clear sky prediction for the short term time interval based on past time intervals of observed irradiance measurements at step 1103.

Prediction correction engine 124 compares data of the observed irradiance curve (OC) 117 to data of the reference curve (RC) 115 for each kth time interval using one or more difference measurement types, and then comparing each difference value to an experimental threshold. For example, mean value, standard deviation value and/or Fréchet distance value may be computed respectively for each time interval of the observation and reference curves, and then the difference between each of the observation values and reference values in the time interval is computed. A past irradiance-based clear sky prediction (CSPP) value based on past irradiance measurements is computed based on difference values compared to experimental thresholds. For example, the short term clear sky prediction contribution from each past observation interval may be computed according to the following expression:

$CSPP_x=1$, if $(((mean(OC_x)-mean(RC_x))<\theta_1$ and $(stdev(OC_x)-stdev(RC_x))<\theta_2)$ or $(frechetDist(OC_x, RC_x)<\theta_3))$ $CSPP_x=0$, otherwise (Eq. 6)

where: $x=T_{pk}$ for $k=1, \ldots, K$;
  $\theta_1, \theta_2, \theta_3$ are predetermined thresholds (e.g., determined by experiment);
  mean is a mean value for the interval;
  stdev is standard deviation value for the interval; and
  frechetDist Fréchet distance value for the interval.

At step 1104, short term prediction for clear sky using the entire past observation period (ST_CSPP) is computed by weighting the clear sky prediction values for the past K time intervals computed in step 1103, with heaviest weighting to most recent value and lowest weighting to the value for the most distant interval. For example, the short term clear sky probability from past irradiance ST_CSPP may computed based on observed irradiance of three past intervals $T_{p1}, T_{p2}, T_{p3}$ for K=3 according to the following expression:

$ST\_CSPP=(CSPP_{T_{p1}}*0.65)+(CSPP_{T_{p2}}*0.25)+(CSPP_{T_{p3}}*0.1)$ (Eq. 7)

Equation 2 may be modified as necessary to accommodate variations to segmentation of past interval $T_p$. Other progressive weight factor sets (e.g., 0.6, 0.3, 0.1) may be applied. In an embodiment, the short term clear sky prediction value ST_CSPP based on past intervals may be used to update the short term prediction curve (e.g., curve segment 904 in FIG. 9) at step 1109.

At step 1105, the irradiance prediction engine 122 applies visual analytics on cloud image data to perform initial cloud segmentation to predict initial future irradiance for the next $T_{fN}$ minutes, such as curve 903 shown in FIG. 9. At step 1106, prediction correction engine 124 divides the future irradiance prediction curve (FC) data into segments (e.g., short term, midterm and long term) and computes a clear sky prediction based on future intervals CSPF using reference curve RC. For example, for N=3 future time intervals, the clear sky prediction may be computed similarly to Eq. 1 according to the following expression:

$CSPF_y=1$, if $((mean(FC_y)-mean(RC_y))<\theta_1$ and stdev $(FC_y)-stdev(RC_y)<\theta_2)$ or $(frechetDist(FCy, RCy)<\theta_3))$ $CSPF_y=0$, otherwise (Eq. 8)

where: $y=T_{fn}$ for $n=1, 2, \ldots, N$;
  $\theta_1, \theta_2, \theta_3$ are experimental thresholds;
  mean is a mean value for the interval;
  stdev is standard deviation value for the interval; and
  frechetDist is a Fréchet distance value for the interval.

At step 1107, short term clear sky probability based on future intervals ST_CSPF is predicted based on weighting of the clear sky probability values of future time intervals beyond the short term (e.g., midterm and long term windows). For example, for N=3, the clear sky probability for window $T_{f1}$ can be computed from weighting the clear sky probability values for future time intervals $T_{f2}$ and $T_{f3}$ with heaviest weighting to the value for the nearest time interval and lowest weighting to the value for most distant time interval, and can be according to the following expression:

$ST\_CSPF=(CSPF_{T_{f2}}*0.65)+(CSPF_{T_{f3}}*0.35)$ (Eq. 9)

Equation 4 may be adjusted according to the number of defined future prediction intervals N. For example, where N=4, CSPF values for intervals $T_{f2}, T_{f3}$ and $T_{f4}$ may be weighted by factors of 0.65, 0.25 and 0.1, respectively. Other progressive weighting value sets may be applied.

In an embodiment, short term clear sky prediction based on future intervals ST_CSPF may be computed to include dependence on previous prediction values for the mid-term time interval $CSPF_{T_{f2}}$. This can be useful to avert an improper corrected prediction for misclassification of cloud pixels in the region of the sun (i.e., for short term interval $T_{f1}$) when in fact the irradiation prediction engine correctly classifies a cloudy condition. For example, consider a situation in which a single cloud blob moves toward the sun. As the cloud blob moves within the $T_{f1}$ prediction horizon, the correct clear sky prediction is clear sky for mid-term and long term prediction intervals greater than $T_{f1}$. However, using equation 4 for corrected prediction would result in concluding that the reduced irradiation prediction curve for short term interval $T_{f1}$ to be a false alarm for cloudiness (i.e., a misclassification of cloud pixels) based on mid-term and long term prediction of clear sky ($CSPF_{T_{f2}}=0$, $CSPF_{T_{f3}}=0$), which would be an incorrect prediction for $T_{f1}$. To include an enhancement for computing short term clear sky prediction ST_CSPF, the following condition may be added to equation 4 for the current prediction (at $T_0$) of clear sky based on previous predictions (between $T_{pK}$ and $T_0$):
where $CSPF_{Tf2}(T_0) = 0$, if $CSPF_{Tf2}(T_{pK} < T < T_0) = 0,$ (Eq. 10)

$= 1$, if $CSPF_{Tf2}(T_{pK} < T < T_0) = 1$

Because mid-term prediction $CSPF_{T_{f2}}$ is weighted greater than long term prediction $CSPF_{T_{f3}}$ (see equation 4), the enhancement shown by equation 4a omits a dependency condition on long term prediction value $CSPF_{T_{f3}}$. In an embodiment, the prediction correction engine 124 updates the short term irradiance prediction curve (e.g., curve segment 904) based on the short term clear sky prediction based on future irradiance prediction ST_CSPF at step 1109.

At step 1108, the prediction correction engine 124 compares the results of equations 3 and 4 and selects the minimum value to derive a final clear sky probability for the short term irradiance. For example, the short term clear sky probability ST_CSP may by computed according to the following expression:

$ST\_CSP=min(ST\_CSPP,ST\_CSPF)$ (Eq. 11)

As an example, for an instance in which the computed past interval-based short term clear sky probability ST_CSPP=0, and the future interval-based short term clear sky probability ST_CSPF=1, then the final short term clear sky probability ST_CSP=min(0,1)=0.

At step 1109, the prediction correction engine 124 corrects the predicted irradiance by using a weighted sum of the reference curve and the cloud segmentation-based irradiance curve, where the weighting is based on a value of short term clear sky probability. In an embodiment, the weighting is based on the past interval-based short term clear sky probability ST_CSPP (step 1104). In another embodiment, the weighting is based on the future interval-based short term clear sky probability ST_CSPF (step 1107). In another embodiment, the weighting is based on the combined interval-based short term clear sky probability ST_CSP (step 1108). As an example of the weighted sum, consider the short term window as shown in FIG. 9 and the corrected irradiance prediction (CP) curve 904 for the region of interest 911, which may be computed as a weighted sum for reference curve 901 and irradiance prediction curve 903 according to the following expression:

$$CP = (\alpha * RC) + ((1-\alpha) * FC) \quad \text{(Eq. 12)}$$

where: α is ST_CSP
RC is reference curve value;
FC is segmentation-based future irradiance prediction value.

Figure 12:
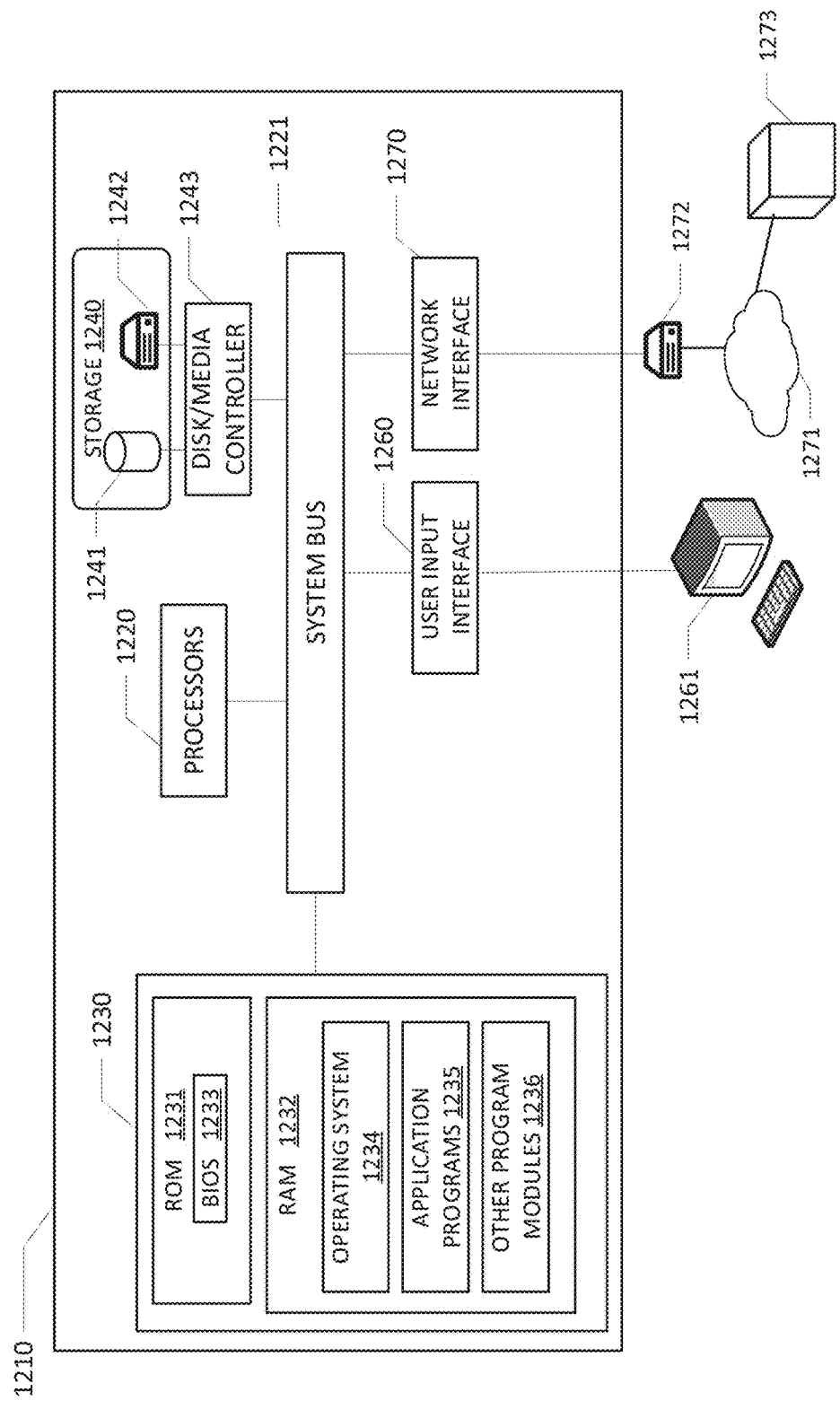
FIG. 12 illustrates an example of a computing environment within which embodiments of the disclosure may be implemented.

FIG. 12 illustrates an example of a computing environment within which embodiments of the present disclosure may be implemented. A computing environment 1200 includes a computer system 1210 that may include a communication mechanism such as a system bus 1221 or other communication mechanism for communicating information within the computer system 1210. The computer system 1210 further includes one or more processors 1220 coupled with the system bus 1221 for processing the information. In an embodiment, computing environment 1200 corresponds to system 100 as shown in FIG. 1 for correcting short term irradiance prediction using inputs from visual and irradiation sensors, in which the computer system 1210 relates to a computer described below in greater detail.

The processors 1220 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1220 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 1221 may include at least one of a system bus, a memory bus, an address bus, or a message bus, and may permit exchange of information (e.g., data (including computer-executable code), signaling, etc.) between various components of the computer system 1210. The system bus 1221 may include, without limitation, a memory bus or a memory controller, a peripheral bus, an accelerated graphics port, and so forth. The system bus 1221 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 12, the computer system 1210 may also include a system memory 1230 coupled to the system bus 1221 for storing information and instructions to be executed by processors 1220. The system memory 1230 may include computer readable storage media in the form of volatile and/or nonvolatile memory, such as read only memory (ROM) 1231 and/or random access memory (RAM) 1232. The RAM 1232 may include other dynamic storage device(s) (e.g., dynamic RAM, static RAM, and synchronous DRAM). The ROM 1231 may include other static storage device(s) (e.g., programmable ROM, erasable PROM, and electrically erasable PROM). In addition, the system memory 1230 may be used for storing temporary variables or other intermediate information during the execution of instructions by the processors 1220. A basic input/output system 1233 (BIOS) containing the basic routines that help to transfer information between elements within computer system 1210, such as during start-up, may be stored in the ROM 1231. RAM 1232 may contain data and/or program modules that are immediately accessible to and/or presently being operated on by the processors 1220. System memory 1230 may additionally include, for example, operating system 1234, application modules 1235, and other program modules 1236. Application modules 1235 other program modules may include aforementioned irradiance data manager 112, reference curve generation engine 114, irradiance prediction engine 122 and prediction correction engine 124 described for FIG. 1 and may also include a user portal for development of the application program, allowing input parameters to be entered and modified as necessary.

The operating system 1234 may be loaded into the memory 1230 and may provide an interface between other application software executing on the computer system 1210 and hardware resources of the computer system 1210. More specifically, the operating system 1234 may include a set of computer-executable instructions for managing hardware resources of the computer system 1210 and for providing common services to other application programs (e.g., managing memory allocation among various application programs). In certain example embodiments, the operating system 1234 may control execution of one or more of the program modules depicted as being stored in the data storage 1240. The operating system 1234 may include any operating system now known or which may be developed in the future including, but not limited to, any server operating system, any mainframe operating system, or any other proprietary or non-proprietary operating system.

The computer system 1210 may also include a disk/media controller 1243 coupled to the system bus 1221 to control one or more storage devices for storing information and instructions, such as a magnetic hard disk 1241 and/or a removable media drive 1242 (e.g., floppy disk drive, compact disc drive, tape drive, flash drive, and/or solid state drive). Storage devices 1240 may be added to the computer system 1210 using an appropriate device interface (e.g., a small computer system interface (SCSI), integrated device electronics (IDE), Universal Serial Bus (USB), or FireWire). Storage devices 1241, 1242 may be external to the computer system 1210.

The computer system 1210 may include a user input interface or graphical user interface (GUI) 1261, which may comprise one or more input devices, such as a keyboard, touchscreen, tablet and/or a pointing device, for interacting with a computer user and providing information to the processors 1220.

The computer system 1210 may perform a portion or all of the processing steps of embodiments of the invention in response to the processors 1220 executing one or more sequences of one or more instructions contained in a memory, such as the system memory 1230. Such instructions may be read into the system memory 1230 from another computer readable medium of storage 1240, such as the magnetic hard disk 1241 or the removable media drive 1242. The magnetic hard disk 1241 and/or removable media drive 1242 may contain one or more data stores and data files used by embodiments of the present disclosure. The data store 1240 may include, but are not limited to, databases (e.g., relational, object-oriented, etc.), file systems, flat files, distributed data stores in which data is stored on more than one node of a computer network, peer-to-peer network data stores, or the like. Data store contents and data files may be encrypted to improve security. The processors 1220 may also be employed in a multi-processing arrangement to execute the one or more sequences of instructions contained in system memory 1230. In alternative embodiments, hardwired circuitry may be used in place of or in combination with software instructions. Thus, embodiments are not limited to any specific combination of hardware circuitry and software.

As stated above, the computer system 1210 may include at least one computer readable medium or memory for holding instructions programmed according to embodiments of the invention and for containing data structures, tables, records, or other data described herein. The term "computer readable medium" as used herein refers to any medium that participates in providing instructions to the processors 1220 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 1241 or removable media drive 1242. Non-limiting examples of volatile media include dynamic memory, such as system memory 1230. Non-limiting examples of transmission media include coaxial cables, copper wire, and fiber optics, including the wires that make up the system bus 1221. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 1200 may further include the computer system 1210 operating in a networked environment using logical connections to one or more remote computers, such as remote computing device 1273. The network interface 1270 may enable communication, for example, with other remote devices 1273 or systems and/or the storage devices 1241, 1242 via the network 1271. Remote computing device 1273 may be a personal computer (laptop or desktop), a mobile device, a server, a router, a network PC, a peer device or other common network node, and typically includes many or all of the elements described above relative to computer system 1210. When used in a networking environment, computer system 1210 may include modem 1272 for establishing communications over a network 1271, such as the Internet. Modem 1272 may be connected to system bus 1221 via user network interface 1270, or via another appropriate mechanism.

Network 1271 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1210 and other computers (e.g., remote computing device 1273). The network 1271 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1271.

It should be appreciated that the program modules, applications, computer-executable instructions, code, or the like depicted in FIG. 12 as being stored in the system memory 1230 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 1210, the remote device 1273, and/or hosted on other computing device(s) accessible via one or more of the network(s) 1271, may be provided to support functionality provided by the program modules, applications, or computer-executable code depicted in FIG. 12 and/or additional or alternate functionality. Further, functionality may be modularized differently such that processing described as being supported collectively by the collection of program modules depicted in FIG. 12 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 12 may be implemented, at least partially, in hardware and/or firmware across any number of devices.

It should further be appreciated that the computer system 1210 may include alternate and/or additional hardware, software, or firmware components beyond those described or depicted without departing from the scope of the disclosure. While various illustrative program modules have been depicted and described as software modules stored in system memory 1230, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, numerous other modifications to the illustrative implementations and architectures described herein are also within the scope of this disclosure. In addition, any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for correcting short term irradiance prediction for control of a photovoltaic power station, comprising:
   a processor for execution of modular programmable instructions;
   a memory having the modular programmable instructions stored thereon, comprising:
      an irradiance data manager configured to:
         generate an observed irradiance curve based on irradiance measurements received from an irradiation sensor;
      a reference curve generation engine configured to:
         generate a reference curve that represents irradiance values for a clear sky day using a parametric prediction model;
      an irradiance prediction engine configured to:
         generate an irradiance prediction curve representing predicted irradiance for a future interval based on the observed irradiance curve and image segmentation and motion filtering of cloud pixels in sky images obtained from a visual sensor; and
      a prediction correction engine configured to:
         correct the irradiance prediction curve within a short term future time interval based on probabilistic analysis of time segmented intervals of the observed irradiance curve, the reference curve, and the irradiance prediction curve, wherein the short term is within twenty minutes.

2. The system of claim 1, wherein the reference curve generation engine is further configured to:
   generate clear sky anchor curves representative of clear sky irradiance associated with a plurality of anchor days within a calendar year; wherein a clear sky anchor curve is determined on a condition that a predicted irradiance curve based on the predictive model matches measured irradiance data for an anchor day within a threshold; and
   generate the clear sky reference curve for a target day by interpolation between two clear sky anchor curves for nearby anchor days.

3. The system of claim 2, wherein the reference curve generation engine is further configured to:
   generate at least one clear sky anchor curve based on irradiance data obtained at a location different than the photovoltaic station.

4. The system of claim 2, wherein at least one clear sky anchor curve is generated by combining clear sky irradiance data of several partial clear sky days, comprising:
   identifying, for each of the several days, a clear sky time segment using a sliding window approach for a complete daylight time span when comparing the measured irradiance data curve to the predicted clear sky irradiance curve;
   combining the clear sky irradiance data of the clear sky time segments to form the clear sky anchor curve; and
   identifying a calendar date for the anchor day by a weighted combination of the dates of the several partial clear sky days.

5. The system of claim 1, wherein the reference curve generation engine is further configured to:
   generate a clear sky anchor curve representative of clear sky irradiance associated with a an anchor day within a calendar year; wherein a clear sky anchor curve is determined on a condition that a predicted irradiance curve based on the predictive model matches measured irradiance data for an anchor day within a threshold; and
   generate the clear sky reference curve for a target day by extrapolation from the anchor curve according to a proportion commensurate with the difference between the anchor day calendar date and the target day calendar date.

6. The system of claim 1, wherein the probabilistic analysis of time segmented intervals includes computing a short term clear sky probability using weighted contributions of past intervals of observed irradiance values with heaviest weighting to the most recent value and lowest weighting to the value for the most distant interval; and wherein the contributions of past intervals are computed based on, for each time interval, a difference between an observation irradiance value and a reference curve value and comparing the difference to a threshold.

7. The system of claim 1, wherein the probabilistic analysis of time segmented intervals includes computing a short term clear sky probability using weighted contributions of future intervals of predicted irradiance values with heaviest weighting to the value for the nearest time interval and lowest weighting to values for the most distant time interval; and wherein the contributions of future intervals are computed based on, for each time interval, a difference between a predicted irradiance value and a reference curve value and comparing the difference to a threshold.

8. The system of claim 7, wherein the contribution of a first future interval is further computed based on prior predicted values for the first future interval, wherein on a condition that any one of the prior predicted values for a set of past time intervals is a value equal to 1, the contribution of the first future interval is a value equal to 1.

9. The system of claim 1, wherein the prediction correction engine corrects the irradiation prediction by using a weighted sum of the reference curve and the irradiation prediction curve, wherein the weighting is a past interval-based clear sky probability value, a future interval-based clear sky probability value, or a combined interval-based clear sky probability value.

10. A method for correcting short term irradiance prediction for control of a photovoltaic power station, comprising:
    generating an observed irradiance curve based on irradiance measurements received from an irradiation sensor;
    generating a reference curve that represents irradiance values for a clear sky day using a parametric prediction model;
    generating an irradiance prediction curve representing predicted irradiance for a future interval based on the observed irradiance curve and image segmentation and motion filtering of cloud pixels in sky images obtained from a visual sensor; and
    correcting the irradiance prediction curve within a short term future time interval based on probabilistic analysis of time segmented intervals of the observed irradiance curve, the reference curve, and the irradiance prediction curve, wherein the short term is within twenty minutes.

11. The method of claim 10, wherein generating the reference curve further comprises:
    generating clear sky anchor curves representative of clear sky irradiance associated with a plurality of anchor days within a calendar year; wherein a clear sky anchor curve is determined on a condition that a predicted irradiance curve based on the predictive model matches measured irradiance data for an anchor day within a threshold; and
    generating the clear sky reference curve for a target day by interpolation between two clear sky anchor curves for nearby anchor days.

12. The method of claim 11, wherein generating the reference curve further comprises:
    generating at least one clear sky anchor curve based on irradiance data obtained at a location different than the photovoltaic station.

13. The method of claim 11, wherein at least one clear sky anchor curve is generated by combining clear sky irradiance data of several partial clear sky days, comprising:
    identifying, for each of the several days, a clear sky time segment using a sliding window approach for a complete daylight time span when comparing the measured irradiance data curve to the predicted clear sky irradiance curve;
    combining the clear sky irradiance data of the clear sky time segments to form the clear sky anchor curve; and
    identifying a calendar date for the anchor day by a weighted combination of the dates of the several partial clear sky days.

14. The method of claim 10, wherein generating the reference curve further comprises:
    generating a clear sky anchor curve representative of clear sky irradiance associated with a an anchor day within a calendar year; wherein a clear sky anchor curve is determined on a condition that a predicted irradiance curve based on the predictive model matches measured irradiance data for an anchor day within a threshold; and generating the clear sky reference curve for a target day by extrapolation from the anchor curve according to a proportion commensurate with the difference between the anchor day calendar date and the target day calendar date.

15. The method of claim 11, wherein the probabilistic analysis of time segmented intervals includes computing a short term clear sky probability using weighted contributions of past intervals of observed irradiance values with heaviest weighting to the most recent value and lowest weighting to the value for the most distant interval; and wherein the contributions of past intervals are computed based on, for each time interval, a difference between an observation irradiance value and a reference curve value and comparing the difference to a threshold.

* * * * *